(12) United States Patent
Walsh et al.

(10) Patent No.: US 8,381,581 B2
(45) Date of Patent: Feb. 26, 2013

(54) VOLUMETRIC MEASUREMENT

(75) Inventors: Christopher Walsh, Ormskirk (GB);
David Charles Lee, Timperley (GB);
Martin Geoffrey Short, Poynton (GB)

(73) Assignee: Brooks Automation, Inc., Chelmsford, MA (US)

( * ) Notice: Subject to any disclaimer, the term of this patent is extended or adjusted under 35 U.S.C. 154(b) by 35 days.

(21) Appl. No.: 12/565,157

(22) Filed: Sep. 23, 2009

(65) Prior Publication Data

US 2011/0067490 A1  Mar. 24, 2011

(51) Int. Cl.
*G01F 17/00* (2006.01)
(52) U.S. Cl. .......................................... 73/149
(58) Field of Classification Search ............ 73/149
See application file for complete search history.

(56) References Cited

U.S. PATENT DOCUMENTS

| | | | |
|---|---|---|---|
| 7,628,064 B1 * | 12/2009 | Miller et al. | 73/149 |
| 2007/0090126 A1 * | 4/2007 | Tanaka et al. | 222/23 |
| 2009/0188311 A1 * | 7/2009 | Cadieux et al. | 73/149 |
| 2011/0056290 A1 * | 3/2011 | Bryant et al. | 73/293 |

OTHER PUBLICATIONS

Chris Walsh and Julio Maher, "Reducing the Cost of Poor Quality Screening Using Vision Technology", RTS Life Science, UK, Apr. 26, 2009, www.rtslifescience.com.*
Julio Maher, Simon Sheard, David Harding and Sue Jones, "Applying Vision Technology to Calculate the Volume of Sample in a Tube", RTS Life Science, UK, Sep. 23, 2008, www.rtslifescience.com.

* cited by examiner

*Primary Examiner* — Lisa Caputo
*Assistant Examiner* — Jamel Williams
(74) *Attorney, Agent, or Firm* — Perman & Green, LLP; Colin C. Durham

(57) ABSTRACT

Disclosed is a method of determining a volume of liquid in a sample tube, comprising the steps of capturing an image of the sample tube, determining a first region of interest within the sample tube based upon pre-stored information concerning dimensional properties of the sample tube, scanning the first region of interest to detect the position of a meniscus indicative of an upper extent of the liquid, and using said meniscus position together with certain pre-stored properties of the sample tube to determine a volume of liquid in the tube, and outputting said volume. Also disclosed is an apparatus for performing the method.

18 Claims, 4 Drawing Sheets

VOLUMETRIC MEASUREMENT

BACKGROUND

In systems which store quantities of liquid samples, e.g. blood samples, chemical samples or other biological samples, robotically operated automated storage systems are commonly used and these can store many thousands or even millions of individual samples in small tubes. Access to the individual tubes is required periodically and it is useful for the operator of such a system to have an indication of the amount of sample stored in a particular tube so that as quantities of the sample are removed over time, an ongoing check can be kept on the volume still available.

Individual sample tubes are typically configured to have a maximum volume of a few milliliters, with typical volumes being 0.3 ml, 0.75 ml, 1.4 ml and 2 ml. A given quantity of tubes is normally stored in a rack which can hold a certain quantity of tubes, e.g. 96 tubes. One storage system can comprise a variety of different tube sizes.

A prior art solution to the problem of assessing volume involves the manual inspection of a particular tube to assess the volume remaining, and this may be supplemented by an estimate from a user. Obviously such a solution is very labour intensive and may not be used when a great quantity of tubes requires verification.

Other, more automated, solutions exist. One of these involves the accurate weighing of a tube, which can give the weight of the sample once the nominal weight of the empty tube is subtracted therefrom. However, this can be a time consuming task and requires individual tubes to be assessed separately.

There are devices available which aim to expedite this process. One such device processes a rack of tubes by selecting a particular tube, reading its identifying bar code and then weighing it. The resulting data is then stored in a file which can be reconciled with the inventory of the entire stock of tubes. Such devices can also be used to pre-weigh the tubes so that the later weight calculation is relatively easy to do. However, this further complicates the inventory system. Also, such devices tend to be quite slow in operation and can take between 20 and 30 minutes to individually weigh a rack consisting of 96 tubes. Furthermore, if individual tubes are not pre-weighed there is a question about how accurate the subsequent volume estimating can be given that there is a noticeable difference in the weight of individual tubes and it has been seen that these can vary by as much as 20 mg.

An alternative approach to using weight to infer a volume in a tube is to utilize a non-contact liquid level detection. This approach uses one or more sensors which are operable to determine the distance between the sensor and the surface of the liquid in a tube. By use of a suitably known tube, the level of the liquid may be used to determine the volume of sample in the tube. An advantage of such a sensor is that it is able to operate at a higher speed than the weighing solution discussed previously. However, a particular shortcoming of such a device is that the tube cap or septa must be removed in order for the upper level of the liquid to be exposed. In addition to increasing the risk of sample cross contamination, this step has major implications for sample quality, unless it is performed in a controlled environment, e.g. a low humidity environment, to prevent the uptake of moisture, which could, of course, upset the volume calculations.

SUMMARY

There therefore exists a desire to provide means by which relatively high speed calculations of remaining volumes of samples in a plurality of tubes can be made, whilst minimizing the risk of contamination or other degradation of sample quality. It is an aim of the preferred embodiments disclosed herein to address the shortcomings in the prior art, whether these are set out in detail above or not.

According to aspects of the preferred embodiment there is provided an apparatus and method as set forth in the appended claims. Other features of the inventive apparatus and method will be apparent from the dependent claims, and the description which follows.

BRIEF DESCRIPTION OF THE DRAWINGS

Aspects of the preferred embodiment will be described in reference to the Drawing, where like numerals reflect like elements.

DETAILED DESCRIPTION OF THE PREFERRED EMBODIMENT

Figure 1:
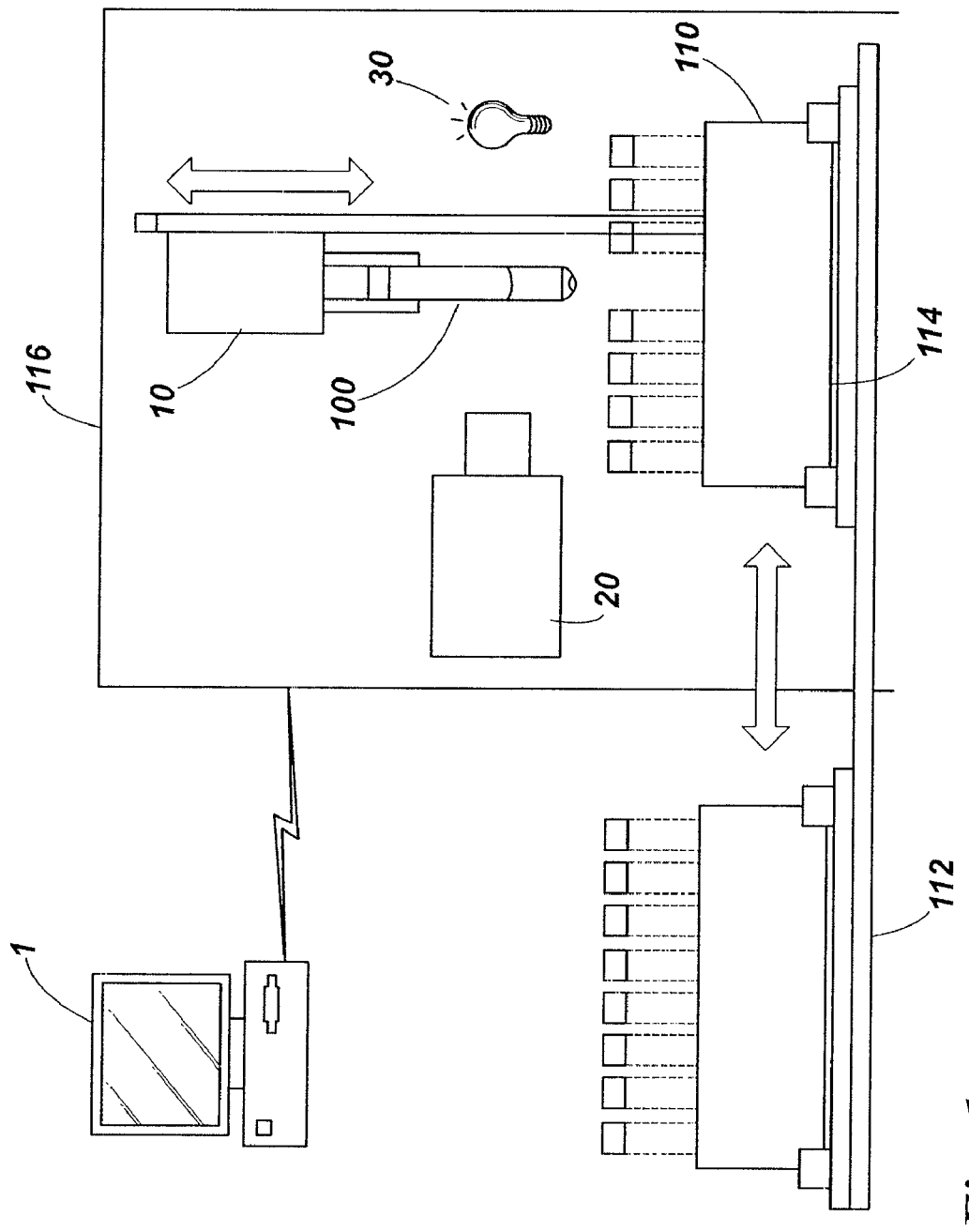
FIG. 1 shows an apparatus according to an embodiment of the disclosure.

FIG. 1 shows a schematic view of an embodiment of a preferred embodiment of the apparatus. The apparatus comprises a robotic gripper 10, which is operable to pick up one or more tubes 100 from within a rack 110. The rack 110 comprises a plurality of tubes 100, arranged in a rectangular matrix arrangement.

The rack 110 is movable from a stowed position 112 to an accessible position 114, from which the gripper 10 can access the tubes 100. The accessible position may be located within a controlled environmental chamber 116.

An alternative embodiment may be provided which is operable only to assess volumes and is not integrated with any other apparatus. Such a device is operable to receive a rack of tubes, to analyze each tube, and return them to the rack. The rack can then be returned to its stowed location or processed as required.

The robotic gripper mechanism is known in the art, and no special knowledge of this device is necessary in order to comprehend embodiments of the disclosure.

Once a particular tube is requested, the gripper 10 is instructed to grip the desired tube and transport it to a further device, where it may be stored or processed in some way. Once the tube 100 is removed from the rack, it is momentarily suspended between a camera 20 and light source 30. The camera captures an image of the tube, illuminated from behind, and the gripper 10 then proceeds to process the tube as requested. There is a small delay whilst the tube's image is captured in this way.

The system is controlled via a suitable programmed computer 1, which is operable to control the gripper 10, and to process the captured image from the camera 20. The computer 1 can also maintain a database of tube volumes which can be updated from time to time, as required.

Once the image has been captured and stored on the computer 1, the image is analyzed to determine the position of the meniscus or upper level of the liquid in the tube. The level of the meniscus can then be used to infer the volume of liquid in the tube. The process will now be described in more detail with reference to the flowcharts shown in FIGS. 2 and 3.

Figure 2:
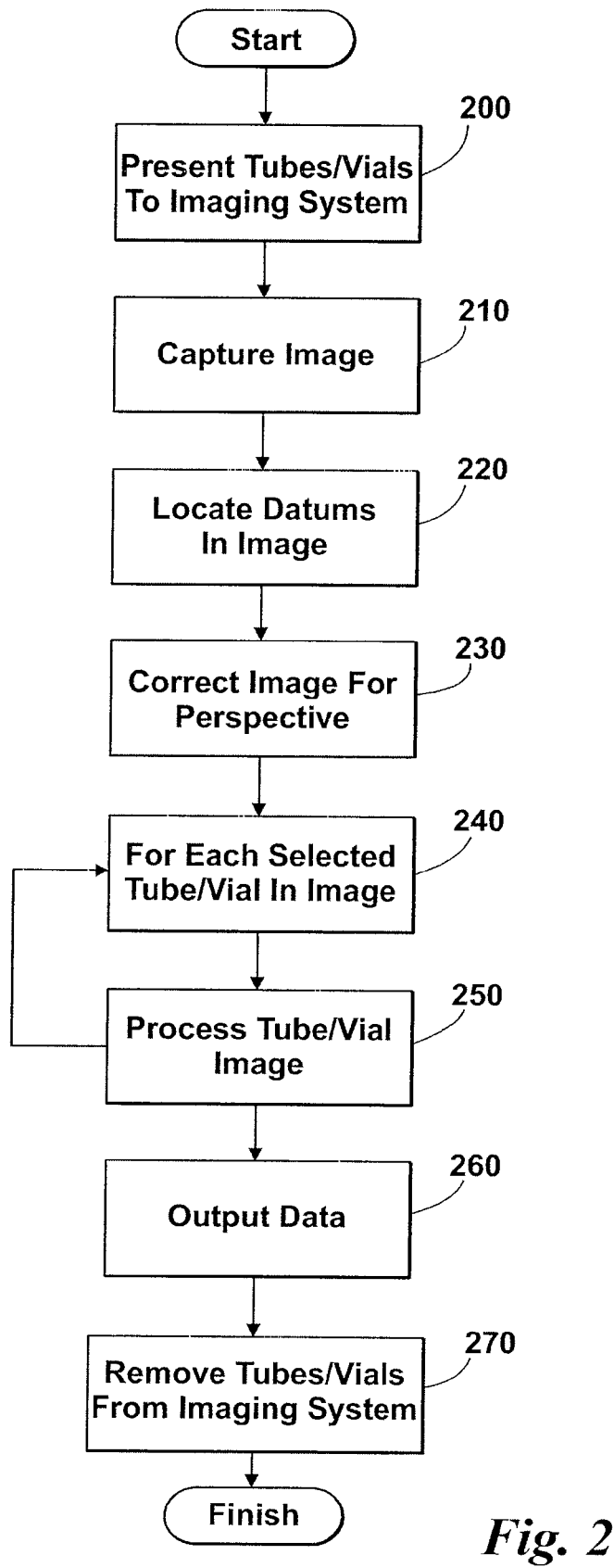
FIG. 2 shows a flowchart related to the operation of an embodiment of the disclosure.

FIG. 2 is a flowchart showing the major steps in the volume calculation process. At step 200, the tube to be assessed is presented to the camera 20 by means of the gripper mechanism 10. The tube 100 is positioned between a light source 30 and the camera 20 so that the tube 100 is backlit. In some instances, if the samples are not essentially transparent, then an additional or alternative light source may be activated. The alternative light source may be positioned to light the tube 100 from the front, the side or any other suitable direction.

At step 210, the image is captured using the camera 20. The camera 20 may be any suitable imaging device and may comprise a regular digital camera, having suitable resolution. For example, one such suitable resolution is 1628×1236 pixels. The camera is activated once the gripper mechanism 10 has indicated to the computer 1 that it is holding the tube 100 stationary in the correct position. The computer is then able to cross-reference the image and the particular tube 100 in its database.

At step 220, the image is processed to locate various datum points. These may be physical markers, located in the background of the imaging position. They can comprise crosshairs, dots or any other suitable marker which the image processing software may use to frame the resultant image. Once the datum points are located, the position of the tube 100 can be accurately determined in relation to these.

At Step 230, the image may be corrected for perspective if required. This may be useful in case the camera 20 and/or the tube 100 are mis-aligned during the image capture step 210.

Step 240 represents the fact that multiple tubes may be processed in sequence as the result of a single pick-up operation by gripper 10. The gripper may be configured to pick up an entire row or column of tubes from a rack. In such a scenario, the camera 30 is operable to image all the selected tubes in a single image. By use of the datum points, already mentioned, the individual tubes can be recognised and processed in turn.

Figure 3:
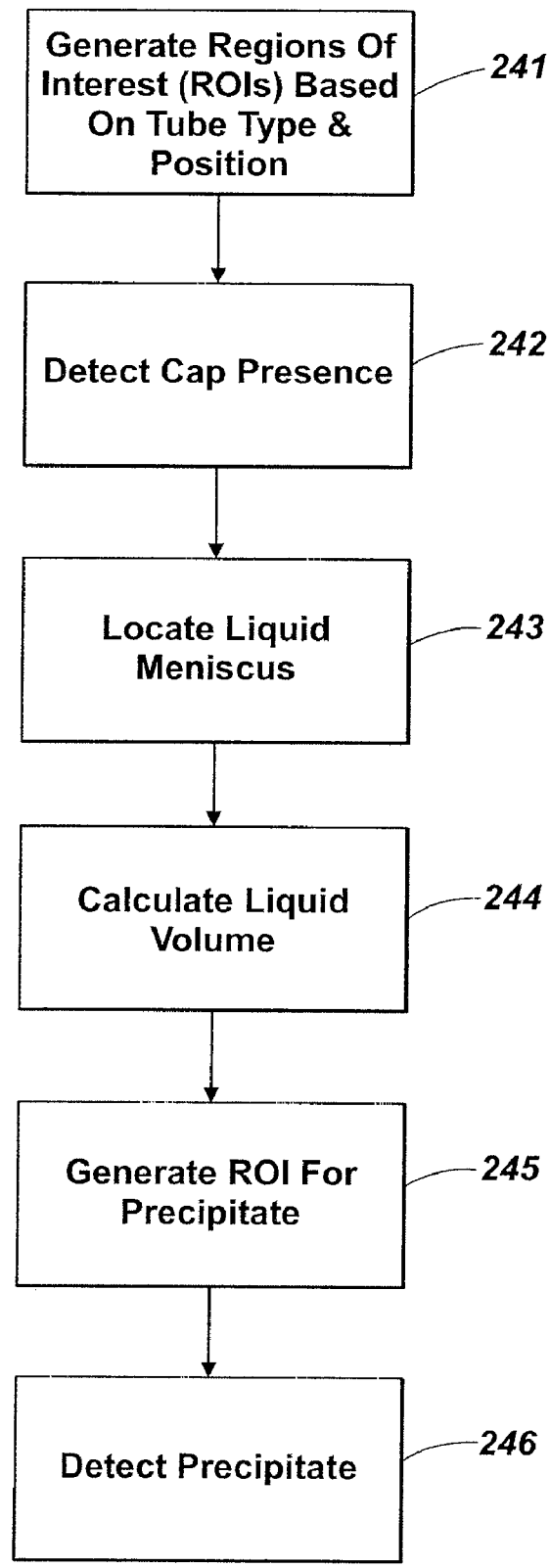
FIG. 3 shows further details of particular steps in the flowchart of FIG. 2.

The iterative process represented by steps 240 and 250 is shown in more detail in FIG. 3, which shows the steps performed for each tube identified.

At step 241, the image processing software generates regions of interest, based on the tube type and its position within the overall imaged frame. These regions of interest correspond to areas which require further processing to locate, e.g. the meniscus.

At step 242, the presence or absence of the tube cap is detected. If the cap is missing, then a flag can be set alongside the data for that particular tube to indicate that there may be a problem with that particular sample. It could be that a mechanical error has occurred, resulting in the loss of the cap, and the sample may be compromised.

At step 243, the image processing software uses an edge-detection algorithm to locate, within the region of interest corresponding to the body of the tube, the upper level of the liquid in the tube, or meniscus. Known edge-detection algorithms may be used for this purpose.

At step 244, the meniscus level determined in the previous step is used to calculate the volume of liquid in the tube. The preferred method of doing this is to use a data look-up table arranged to correlate a given meniscus level with a pre-determined volume which has either been measured or calculated previously.

The image processing software is either informed what tube type is in use or is able to distinguish different tube types from each other. Consequently, two variables may be passed to the look up table: tube_type_identifier and meniscus_level. In this way an accurate volume can be given which is tailored to a particular tube type.

At step 245, the image processing software is operable to generate a further region of interest located towards the lower end of the tube. By seeking an edge or difference in colour or brightness in this region, it is possible to infer that the sample includes a quantity of precipitate.

The region of interest defined in step 245 is arranged to be somewhat smaller than the volume of liquid measured in the tube. In this way, it is possible to ensure that only precipitates positioned lower than the measured meniscus are detected, avoiding false positive detections.

Users of embodiments of the disclosed device and method are not generally interested in the quantity of precipitate: the mere presence of solid material in the sample is usually sufficient information to trigger possible further investigation if required. However, in some cases, an indication of the volume of precipitate can be useful, and using the same look up table technique, it is possible to determine a volume of precipitate and log this value.

The steps 241-246 are repeated as many times as there are tubes in a particular pick-up operation.

With further reference to FIG. 2, at step 260 the data generated in the preceding steps is output, either to be stored in a database for further analysis, or in real-time to a user.

The format of the data can be set according to the preference of the user, but it may be in the format:
TUBE_ID, CAP_PRESENT(YES/NO), VOLUME, PRECIPITATE(VOLUME or YES/NO)

At step 270, the tube 100 is removed from the imaging system and continues to its next destination, which may be a further process or storage, for instance. Alternatively, in the benchtop embodiment of the invention, the tube(s) is/are simply returned to the rack.

Figure 4:
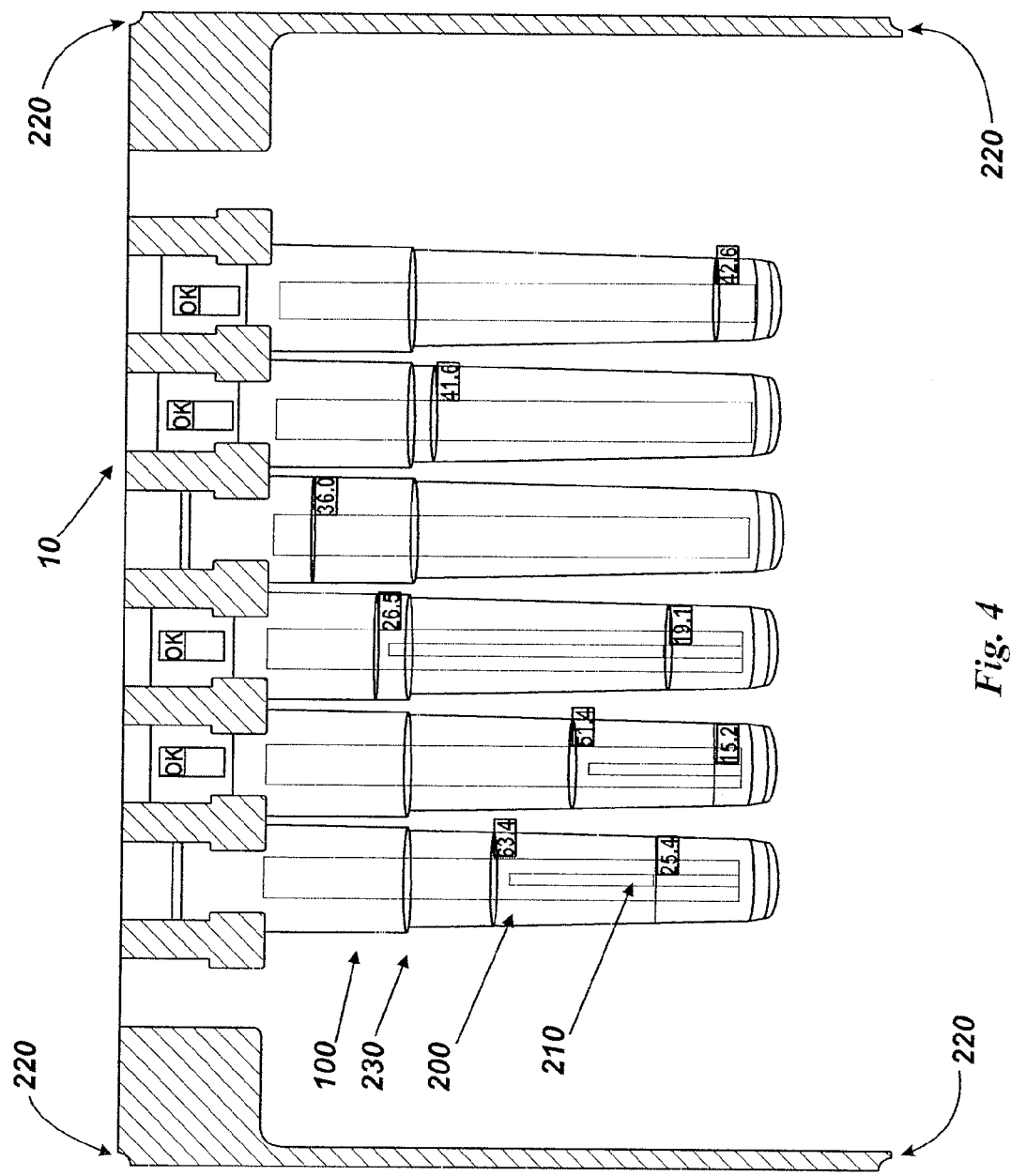
FIG. 4 shows a sample captured image.

FIG. 4 shows a sample image captured from camera 30. The datum points 220 are clearly visible in each corner of the image. These are used to frame the image and as a basis for calculating all subsequent distances. By use of the datum points 220, the image processing software is able to determine the expected position of one or more tubes in the gripper 10.

FIG. 4 shows the gripper 10 and six tubes of varying volume. The three leftmost tubes include a precipitate and the three rightmost tubes do not.

In order to assess the volume of a particular tube, a first region of interest 200 is defined. This region of interest is based upon the position of the tube 100 within the apparatus, this position being determined in relation to the datum points 220.

In order to determine the level of the meniscus within the region 200, the image processing software is operable to scan in a downwards direction from the top of the region 210 until an edge is detected. Edge detection algorithms per se are well known and any suitable algorithm may be used.

Once a first edge is detected in this way, it is registered as the meniscus position, and a corresponding volume can be determined as has been described herein.

The next step involved defining a second region of interest 210 for detecting a possible precipitate. This region is defined to lie within the first region, begins just below the meniscus and extends down towards the bottom of the tube. This region 210 is then scanned in an attempt to locate a further edge or contrast shift, indicative of the presence of a precipitate. No attempt is made to determine the volume of the precipitate and a simple yes/no determination is made.

As noted above, it is also possible to determine from the image whether a particular tube is capped or not. The image processing software is arranged to examine an area at the top of the tube to determine the presence or absence of a cap. The result of this determination is output along with the other data. By examining the area in which a cap is expected to be, the absence of a cap is quite apparent and easy to determine. However, it is also possible to determine an incorrectly fitted cap if it is present outside of the expected area and this can be reported to the user.

In the specific example shown in FIG. 4, it can be seen that the tube has a 'neck' region 230 partway along its length. This neck region could possibly interfere with determining the position of the meniscus. Other tube configurations may have similar features which could complicate the process.

As a first attempt, the region of interest 200 may be searched above and then below the neck 230 and if no meniscus is found, then it may be inferred that the meniscus is located in or near the neck region 230. In this case, further steps may be taken to focus in on that region. For instance, a 'mask' image may be available which can effectively be subtracted from the captured image, said mask image being a representation of an empty tube. This approach can reveal the presence of the meniscus more clearly. Another approach would be to median-filter the neck region 230 so that thin edges in the horizontal direction can be removed, thereby revealing the meniscus which has a generally thicker edge. Other techniques may be possible depending on the particular configuration of tube.

An aim of the image processing process is to maintain a relatively low level of computational complexity, unless further effort is required. For instance, if the meniscus can be easily determined, then the basic algorithm is used. If the meniscus cannot be located, then it is possible that the tube is empty or that the meniscus is obscured by the neck region 230, for instance. In that case, then one or more further operations are performed to attempt to locate the meniscus and return a value for the volume.

An optional feature, which may be added to the system, is a barcode reader which is able to read the unique barcode on a given tube or rack, so that little or no manual intervention is required once the rack of tubes has been loaded. The bar code reader can be located as required in order to scan the bar codes of the tubes or rack as the rack is loaded.

Embodiments of the disclosed system can quickly and accurately determine the volume of one or more tubes from a standard rack of tubes. The tubes can remain capped at all times, thus minimising or avoiding the risk of contamination.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments. The invention extends to any novel embodiment or combination, of the features disclosed in this specification (including any accompanying claims, abstract and drawings), or to any novel embodiment or combination, of the steps of any method or process so disclosed.

The invention claimed is:

1. A method of determining a volume of liquid in a sample tube, comprising the steps of:
    capturing an image of the sample tube;
    determining at least a first region of interest within the sample tube based upon the image and pre-stored information concerning dimensional properties of the sample tube and subsequently determining a subsequent region of interest based upon the image that is different than the first region of interest, the image being common to the first region of interest and the subsequent region of interest;
    scanning the first region of interest to detect the position of a meniscus indicative of an upper extent of the liquid;
    determining a volume of liquid in the tube by using said meniscus position as determined from the image together with certain pre-stored properties of the sample tube; and
    outputting said volume.

2. The method of claim 1 wherein the step of scanning the first region of interest comprises the use of an edge-detect algorithm to locate a discontinuity within the first region of interest.

3. The method of claim 1 wherein the step of determining the volume comprises inputting the measured meniscus position to a table of pre-stored data to determine a corresponding volume.

4. The method of claim 1 wherein the step of outputting said volume comprises outputting to a database for further analysis.

5. The method of claim 1 wherein the step of outputting said volume comprises outputting via a display device to a user.

6. The method of claim 1 wherein the subsequent region of interest defines a second region of interest, positioned below the meniscus position and further comprising:
    scanning said second region of interest to detect a possible discontinuity in the second region of interest; and
    recording the presence or absence of a precipitate depending upon the presence or absence of a discontinuity.

7. The method of claim 1 comprising the further steps of detecting the presence or absence of a cap on the sample tube and recording the cap presence or absence result.

8. The method of claim 1 comprising the further steps of reading a bar code associated with one or more sample tubes and recording the result.

9. The method of claim 1 wherein the step of capturing an image of the sample tube includes capturing the image of a plurality of sample tubes simultaneously.

10. An apparatus operable to determine a volume of liquid in a sample tube, comprising:
    a camera for capturing an image of the sample tube;
    an image processor operable to
        determine at least a first region of interest within the sample tube based upon the image and pre-stored information concerning dimensional properties of the sample tube and a subsequent region of interest based upon the image that is different than the first region of interest where the image is common to both the first region of interest and the subsequent region of interest,
        scan the first region of interest to detect the position of a meniscus, indicative of an upper extent of the liquid, determine a volume of liquid in the tube by using said meniscus position as determined from the image together with certain pre-stored properties of the sample tube, and output said volume.

11. The apparatus of claim 10 wherein the image processor is operable to scan the first region of interest, and to use an edge-detect algorithm to locate a discontinuity within the first region of interest.

12. The apparatus of claim 10 wherein the image processor is operable to input the measured meniscus position to a table of pre-stored data to determine a corresponding volume.

13. The apparatus of claim 10 wherein the image processor is operable to output to a database for further analysis.

14. The apparatus of claim 10 wherein the image processor is operable to output via a display device to a user.

15. The apparatus of claim 10 wherein the subsequent region of interest defines a second region of interest positioned below the meniscus position and the image processor is operable to scan said second region of interest to detect a possible discontinuity in the second region of interest, and record the presence or absence of a precipitate depending upon the presence or absence of a discontinuity.

16. The apparatus of claim 10 wherein the image processor is operable to detect the presence or absence of a cap on the sample tube, and to record the cap presence or absence result.

17. The apparatus of claim 10 further comprising a bar code reader for reading a bar code associated with one or more sample tubes.

18. The apparatus of claim 10 operable to capture a plurality of sample tube images simultaneously.

* * * * *